(12) United States Patent
Ngai

(10) Patent No.: US 10,578,789 B2
(45) Date of Patent: *Mar. 3, 2020

(54) OPTICAL SYSTEM AND METHOD FOR MANAGING BRIGHTNESS CONTRASTS BETWEEN HIGH BRIGHTNESS LIGHT SOURCES AND SURROUNDING SURFACES

(71) Applicant: ABL IP Holding, LLC, Conyers, GA (US)

(72) Inventor: Peter Y. Y. Ngai, Alamo, CA (US)

(73) Assignee: ABL IP Holding, LLC, Conyers, GA (US)

( * ) Notice: Subject to any disclaimer, the term of this patent is extended or adjusted under 35 U.S.C. 154(b) by 927 days.

This patent is subject to a terminal disclaimer.

(21) Appl. No.: 14/968,776

(22) Filed: Dec. 14, 2015

(65) Prior Publication Data

US 2016/0356940 A1    Dec. 8, 2016

Related U.S. Application Data

(63) Continuation-in-part of application No. 12/397,222, filed on Mar. 3, 2009, now Pat. No. 9,212,796.
(Continued)

(51) Int. Cl.
*F21V 8/00* (2006.01)
*F21S 8/08* (2006.01)
(Continued)

(52) U.S. Cl.
CPC ............ *G02B 6/0021* (2013.01); *F21S 8/086* (2013.01); *G02B 6/0068* (2013.01); *G02B 6/0078* (2013.01); *F21V 5/02* (2013.01); *F21W 2131/103* (2013.01); *F21Y 2105/00* (2013.01); *F21Y 2105/10* (2016.08); *F21Y 2115/10* (2016.08); *G02B 6/0055* (2013.01)

(58) Field of Classification Search
CPC .. G02B 6/0021; G02B 6/0038; G02B 6/0051; G02B 6/0068; G02B 6/0073; G02B 6/0055
See application file for complete search history.

(56) References Cited

U.S. PATENT DOCUMENTS 3,491,245 A    1/1970  Hardesty
4,729,067 A    3/1988  Ohe
(Continued)

FOREIGN PATENT DOCUMENTS

WO    2006/034831 A2    4/2006

*Primary Examiner* — Anh T Mai
*Assistant Examiner* — Michael Chiang
(74) *Attorney, Agent, or Firm* — Beeson Skinner Beverly, LLP

(57) ABSTRACT

An optical system and method provides at least one, and preferably an array of relatively small, high brightness light sources with a surrounding surface that exhibits brightness, thereby reducing the contrast between the high brightness produced by the light sources and the brightness of their surrounding surfaces. The optical system includes a light waveguide structure that captures a portion of the light from the individual high-brightness light sources, and then re-emits the source light to create brightness in the light sources' surrounding surfaces. The optical system is particularly adapted for use with LEDs, but could be used with LEDs, but could be used with other high brightness light sources.

5 Claims, 19 Drawing Sheets

Related U.S. Application Data

(60) Provisional application No. 61/068,066, filed on Mar. 3, 2008.

(51) Int. Cl.
   *F21W 131/103* (2006.01)
   *F21Y 105/10* (2016.01)
   *F21Y 105/00* (2016.01)
   *F21V 5/02* (2006.01)
   *F21Y 115/10* (2016.01)

(56) References Cited

U.S. PATENT DOCUMENTS

| | | |
|---|---|---|
| 5,746,493 A | 5/1998 | Jonsson |
| 6,024,462 A | 2/2000 | Whitehead |
| 6,079,844 A | 6/2000 | Whitehead |
| 6,789,929 B1 | 9/2004 | Doong |
| 7,229,194 B2 | 6/2007 | Liu et al. |
| 7,708,444 B2 | 5/2010 | Sakai et al. |
| 2002/0001183 A1 | 1/2002 | Shigehiro |
| 2003/0133285 A1 | 7/2003 | Ludwig |
| 2004/0151006 A1 | 8/2004 | Yang |
| 2005/0129357 A1 | 6/2005 | Yang |
| 2006/0002146 A1* | 1/2006 | Baba .............. G02B 6/0021 362/613 |
| 2007/0002453 A1 | 1/2007 | Munro |
| 2007/0121340 A1 | 5/2007 | Hoshi |
| 2007/0147067 A1 | 6/2007 | Chuang et al. |
| 2008/0048095 A1* | 2/2008 | Matheson ............. F21K 9/00 250/201.1 |
| 2010/0046217 A1* | 2/2010 | Ngai .................. F21S 8/086 362/235 |
| 2011/0149594 A1* | 6/2011 | Terajima ........... G02B 6/0021 362/606 |

\* cited by examiner

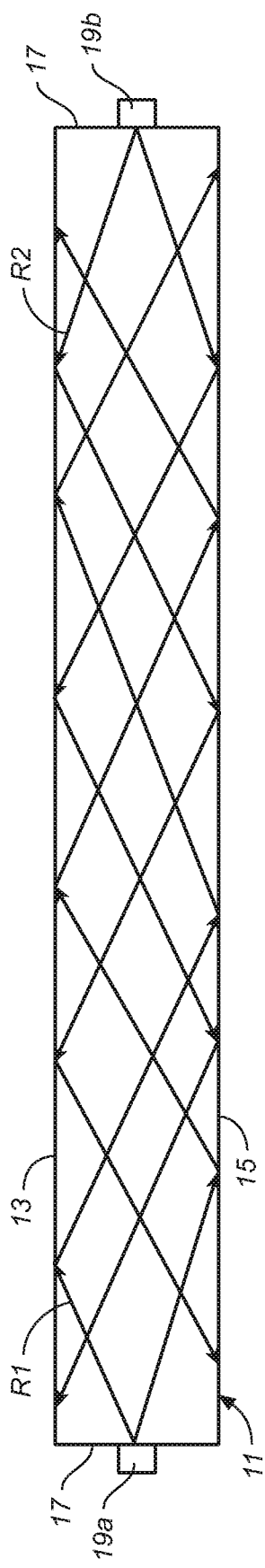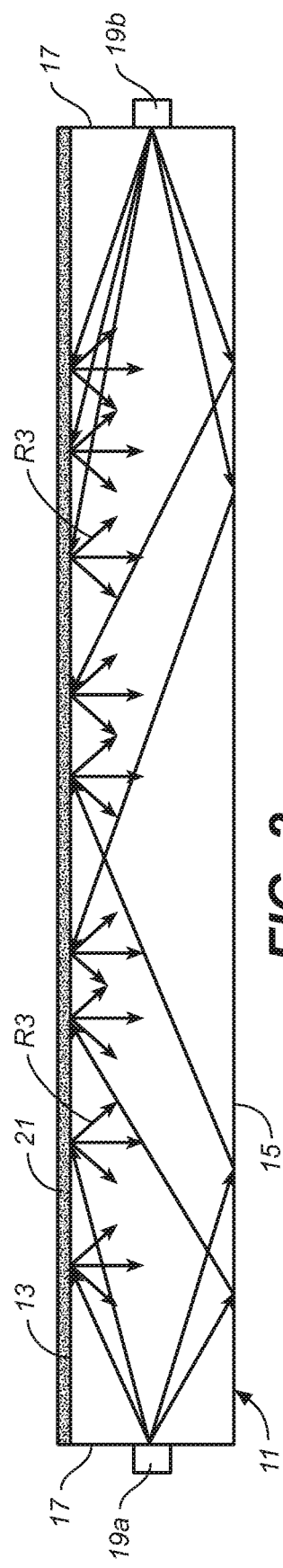

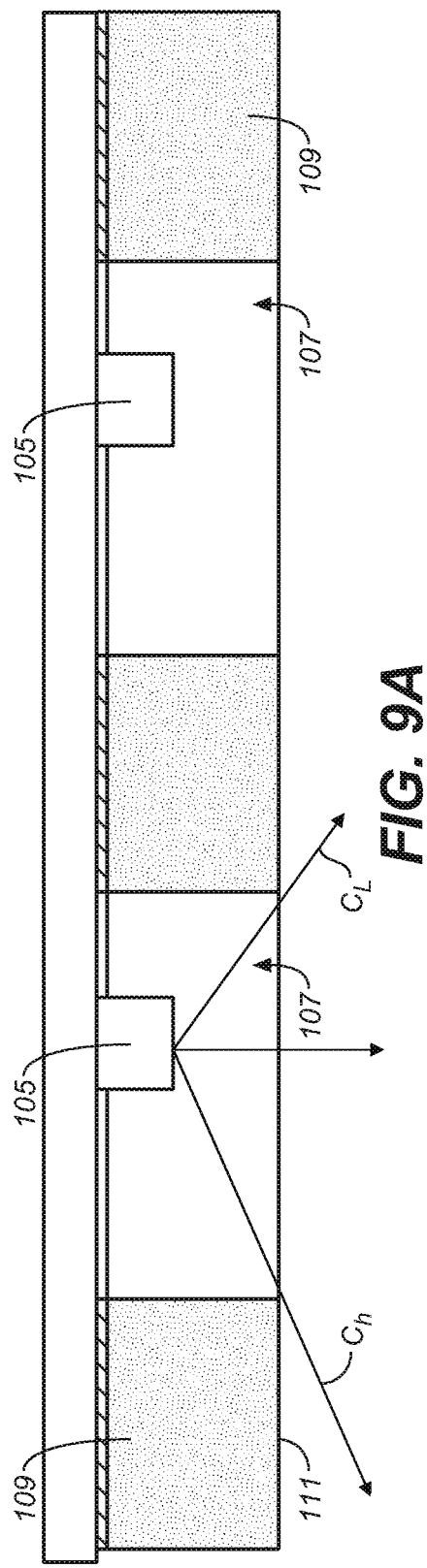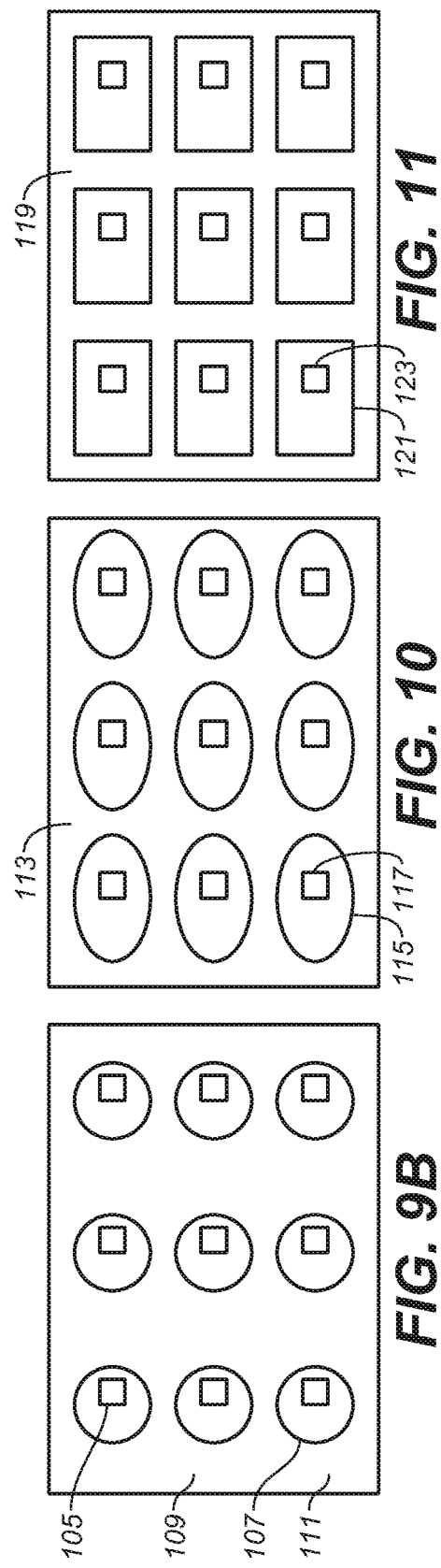

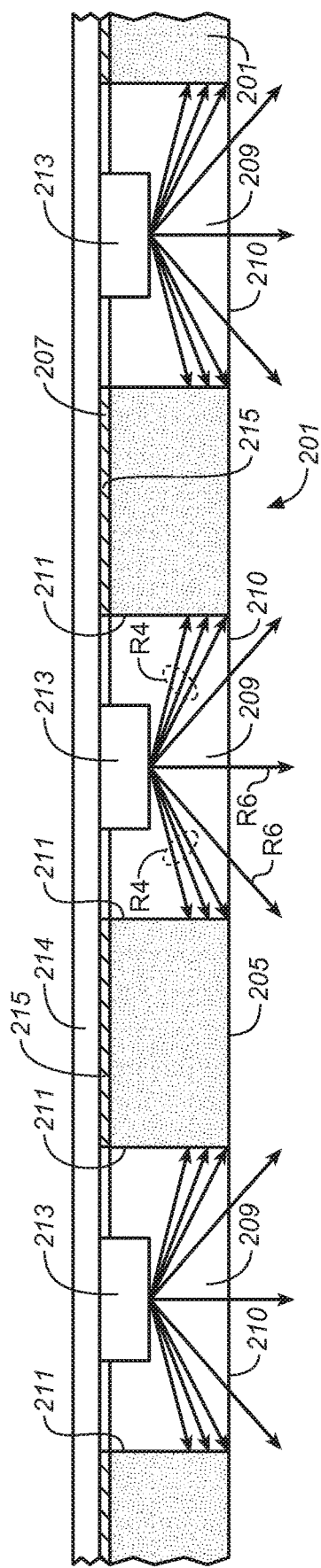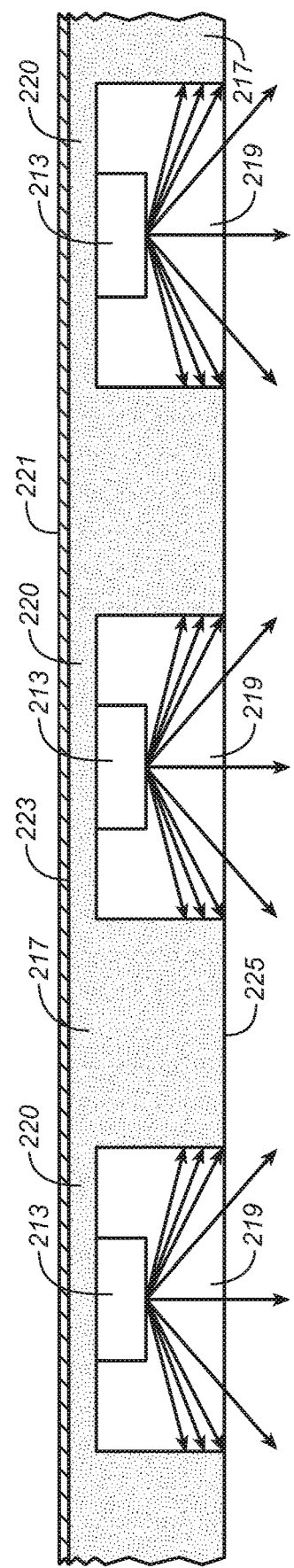

OPTICAL SYSTEM AND METHOD FOR MANAGING BRIGHTNESS CONTRASTS BETWEEN HIGH BRIGHTNESS LIGHT SOURCES AND SURROUNDING SURFACES

CROSS-REFERENCE TO RELATED APPLICATIONS

This is a continuation-in-part of application Ser. No. 12/397,22 filed Mar. 3, 2009, which claims the benefit of U.S. provisional application No. 61/068,066 filed Mar. 3, 2008.

BACKGROUND OF INVENTION

The present invention generally relates luminaires and lighting systems for providing general and specialty lighting, and more particularly to luminaires and lighting systems employing light sources that are relatively bright, such as light emitting diodes (LEDs).

LEDs are increasingly used in lighting applications because of their energy efficiency, that is, their ability to produce a given lumen output per watt consumed. Such light sources are relatively small and intensely bright. For example, an LED that is rated at just ⅛ watt and that produces 30 lumens per watt can have a brightness of between approximately 50,000 to 300,000 candelas per square meter for LED sizes ranging from 25 $mm^2$ down to 4 $mm^2$. For LEDs having higher wattage ratings the brightness increases dramatically.

Often LED are employed in applications where the intense brightness they produce contrasts with surrounding surfaces that are unilluminated or relatively dark. Such brightness contrasts can produce visual discomfort and will, in many applications, be undesirable. The present invention overcomes the problems associated with such contrasts in brightness by providing a unique and versatile optical system and method for managing the brightness of surfaces surrounding relatively bright light sources used by a luminaire or lighting system. The invention manages the brightness contrast between bright light sources and surrounding surfaces that are normally relatively dark without the need to add additional sources of light to illuminate the surrounding surfaces. An optical system in accordance with the invention will also permit a lighting designer to create different distributions of light from the optical system.

SUMMARY OF THE INVENTION

The present invention involves an optical system and method for providing at least one, and preferably an array of high brightness light sources with a surrounding structure that captures and re-emits a portion of the light from the individual high-brightness light sources. The re-emitted light creates brightness in surfaces that surround the high brightness light sources and reduces observable brightness contrasts. The light source surround structure is provided in the form of one or more light waveguides in a plane (which could be flat or curved) having at least one and preferably an array of source light channels into which or behind which high brightness light sources are placed and through which a portion of the available light produced by the high brightness light sources is emitted. Each of the source light channels present internal waveguide surfaces for capturing a portion of the light emitted by the light sources. The light waveguide or waveguides that form the surround are provided with a light extractor, such as an optically bonded reflective diffuse surface, for extracting the portion of the light captured by the waveguide through the front facing, light emitting surface of the waveguide that surrounds the light sources. Because of this extracted light, the light emitting surface will exhibit a level of brightness that reduces brightness contrast with respect to observable brightness produced by the light sources.

DESCRIPTION OF THE DRAWINGS

FIG. 1 is a graphical depiction of a light waveguide illustrating the basic light piping principle of such waveguides.

FIG. 2 is a graphical depiction of a light waveguide with an optically bonded diffusing surface used for extracting light from the waveguide.

FIG. 9A is a graphical depiction of yet another variation of an optical system in accordance with the present invention, wherein the variation resides in the placement of the light source in the source light openings of the light waveguide.

FIG. 9B is a bottom plan view of the optical system shown in FIG. 9A.

FIGS. 10 and 11 are graphical depictions of still further variations of an optical system in accordance with the present invention, wherein the variations reside in the shape of the light source light openings of the light waveguide.

FIGS. 16A-18 are graphical depictions of further alternative embodiments of an optical system in accordance with the invention, wherein the source light openings in the light waveguide are provided in the form of straight source light channels instead of round, oval or square openings as illustrated in the foregoing figures.

DESCRIPTION OF THE ILLUSTRATED EMBODIMENTS

Figure 3:
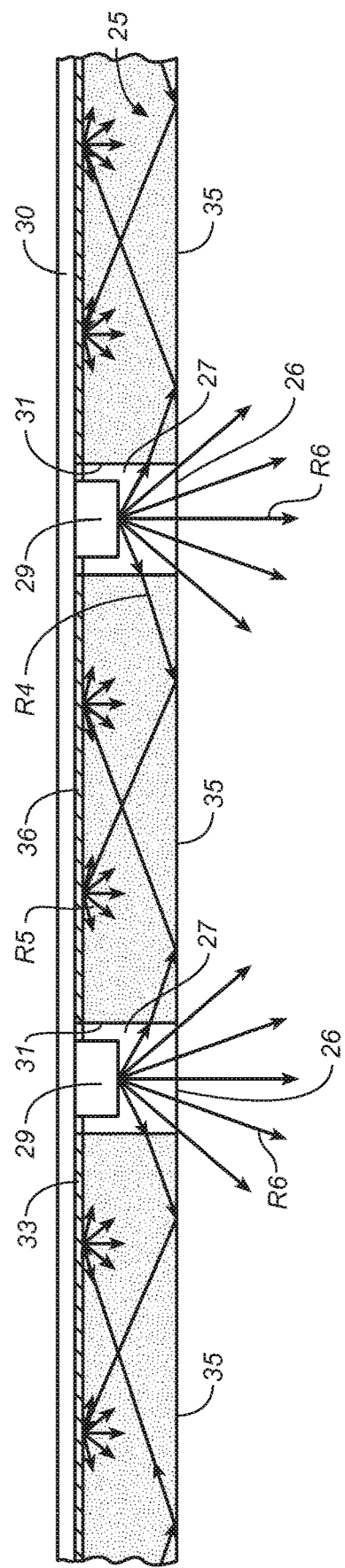
FIG. 3 is a partial sectional view of an optical system in accordance with the invention, wherein an array of high-brightness light sources are set into a light waveguide for producing surround brightness that reduces the contrast brightness between the surround surfaces and the light sources.

The present invention involves the management of the often extreme brightness contrasts that exist between small high brightness light sources, such as LEDs, and surfaces that surround the light sources. As used herein, the term "high brightness" means ranges of brightness typically produced by LEDs. While LEDs are referred to throughout this description, it shall be understood that the invention is not limited to the use of LEDs, but could employ other small commercially available light sources, such as plasma light sources, that exhibit similar levels of brightness. The management of surround surface brightness is uniquely achieved in the invention using light waveguides.

FIGS. 1 and 2 generally illustrate the principle of the light waveguide used in the invention. Light waveguides, also sometimes referred to as "light guides" or "light pipes," are well known. The light waveguide works on the principle of internal reflections governed by Snell's Law, and permits light introduced at the edges of the guide to be piped down the guide without emerging from the guide's parallel surfaces. Referring to FIG. 1, a light waveguide 11 fabricated of a clear light transmitting material, such as clear plastic or glass, has parallel top and bottom surfaces 13, 15, and edges 17 through which light can be introduced into the guide. In the illustrated waveguide, light is introduced into each of the guide's edges 17 by means of graphically illustrated light sources 19a, 19b. The light produced by these sources is piped down the guide, as represented by light rays R1 with respect to light source 19a, and R2 with respect to light source 19b. Because of the high angle of incidence of light rays R1 and R2 on surfaces 13, 15 of the waveguide, the light rays will internally reflect off of these surfaces and consequently will not escape the guide. (The angle of incidence is the angle at which the light ray strikes a surface relative to a line perpendicular to the surface.)

Referring to FIG. 2, the extraction of the light produced by light sources 19a, 19b can be achieved by providing an optical mechanism for changing the manner in which the light rays reflect off one or the other of the surfaces of the guide. In the case of the light guide shown in FIG. 2, the surface 13 of the guide is provided with a layer 21 of a light diffusing reflective material, which is optically bonded to this surface. For example, the optically bonded surface can be provided in the form of highly reflective diffuse paint, or a separate diffuse reflector element bonded to surface 13 by an optical adhesive having a reflective index that substantially matches the light waveguide. The optically bonded layer 21 acts as an "extractor" for the light piped in from the edges 17 of the guide by changing the nature of the internal reflections from surface 13. The reflections are now diffuse in nature resulting in reflected light being scattered toward the opposite surface 15 of the guide as represented by light rays R3. Scattered light that strikes the opposite surface 15 at low angles of incidence (closer to the perpendicular) will emerge from this surface, which will cause the surface to illuminate and exhibit brightness. The component of diffused light coming off surface 13 at high angles will continue to be piped down the waveguide for later extraction. Such techniques for extracting light from a light waveguide are well known in the art.

FIG. 3 shows a lighting system in accordance with the invention wherein the properties of a light waveguide are advantageously used to create surround brightness around an array of LEDs (or other small bright light sources) from a portion of the light emitted by the LEDs. Referring to FIG. 3, it can be seen that a light waveguide 25 is provided with an array of source light openings 27 into which there is set an array of LED light sources 29 mounted to a suitable back plate 30. Each of the source light openings presents an internal light injection surface 31, which, in the illustrated embodiment, is perpendicular to the guide's parallel front and back surfaces 35 and 36, but which could extend between the guide's front and back surfaces at an angle, or which could be an irregular surface designed to meet particular performance requirements. (The singular "surface" as used hereinafter shall be understood to encompass internal surface configurations that have plural surfaces, such as four surfaces created by a square opening.) The internal light injection surfaces 31 of the source light openings 27 receive a portion of the light emitted by the LEDs 29 as represented by light rays R4, and this portion of the available light from the LEDs is injected into and captured by the surrounding light waveguide. An optically bonded reflective diffuser layer 33 on the back surface 36 of the light waveguide provides an extractor for this captured light. Light extraction is achieved by the diffusion or scattering of the light reflected of the reflective diffuser layer as above-described and as represented by scatter light arrows R5. The scattered light emerges from the front surface 35 of the waveguide surrounding the LEDs, causing surface 35 to exhibit brightness. To extract light, the reflective diffuser layer 33 need not provide a perfectly diffuse surface, but could provide a surface that is semi-diffuse, and reference herein to a diffuse layer or surface shall include a semi-diffuse layer or surface unless otherwise indicated.

As represented by light rays R6 in FIG. 3, much of the light, or luminous flux, that is produced by the LED light sources 29 emerges directly from the front light exit end 26 of the source light openings 27. This directly emitted light will produce relatively intense visible brightness at each opening. However, the contrast normally produced between the source brightness and the surfaces that surround the light sources is reduced by the fact that a portion of the source light is captured by the surrounding light waveguide and emitted through the guide's front surface 35. The degree of brightness produced on this surrounding surface will depend on a number of factors including the percentage of available source light captured by the light waveguide, the total light output of each LED, the density and distribution of the LEDs in the waveguide, the outer perimeter geometry of the waveguide, and the reflective properties of the reflecting diffuser layer backing of the waveguide.

In regards to the amount of available source light captured by the waveguide, this could be changed by adjusting the degree of inset of the LED sources 29 within the source light openings 27 of waveguide 25. As later discussed, other techniques for adjusting the amount of light captured by the waveguide can be employed, such as altering the shape and/or size of the source light openings or the thickness of the waveguide.

It will be understood that, rather than insetting the light sources into the waveguide's source light openings as illustrated in FIG. 3, the light sources could alternatively be positioned behind these opening in conjunction with secondary reflectors or other light control elements that direct light from the light sources into the openings. However, inset light sources are preferred because they provide greater efficiency and would be easier to manufacture. It will also be understood that the shape of the LEDs illustrated in the drawings is illustrative only. LEDs having different shapes and that have shaped front lenses incorporated into the LED could be used.

Figure 4:
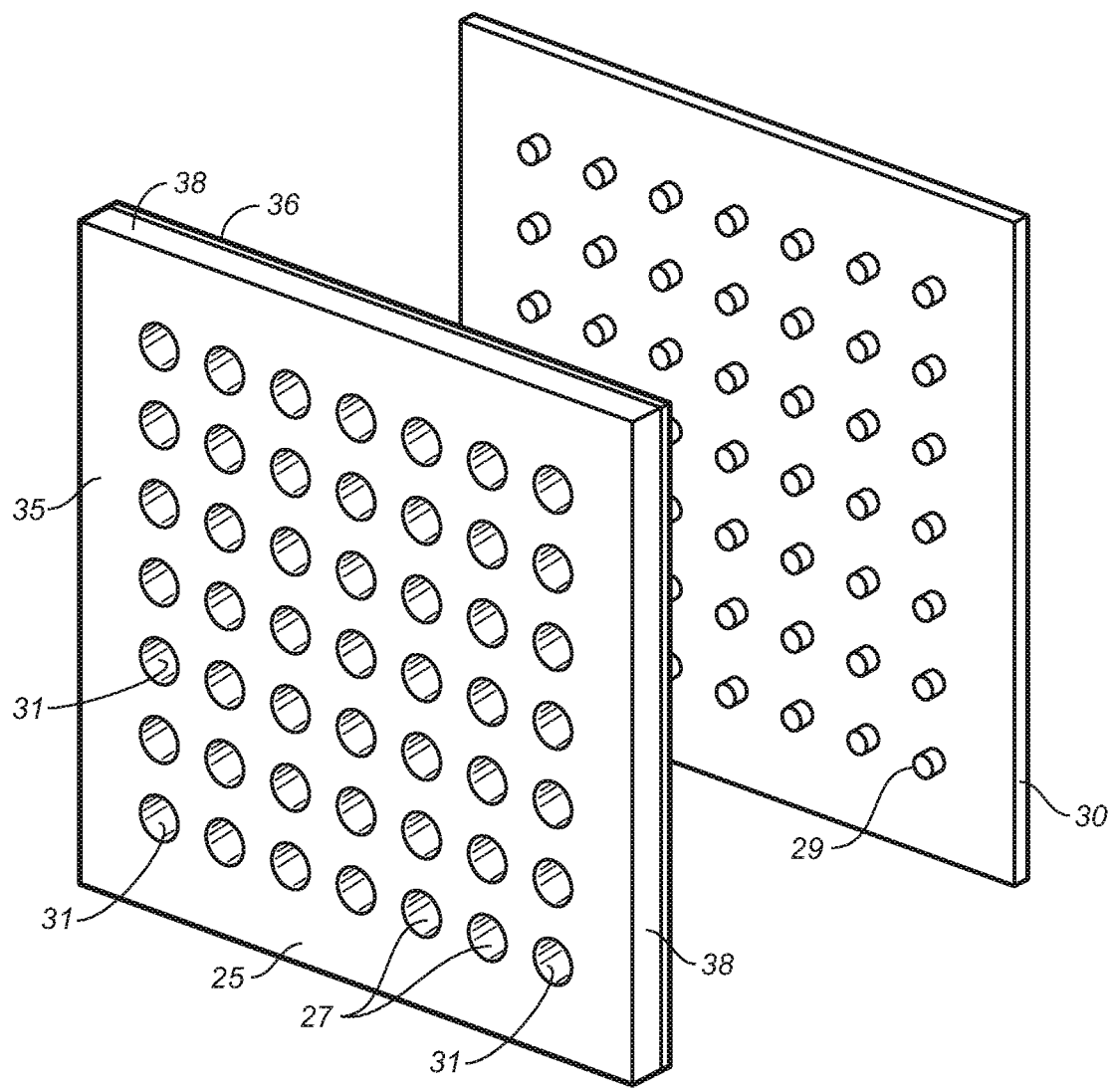
FIG. 4 is an exploded perspective view of an optical system in accordance with the invention as shown in FIG. 3, wherein the optical system is configured in a square planar array of light sources.

An implementation of the invention is further shown in FIG. 4, wherein a square planar light waveguide 25 is provided with a 7×7 two-dimensional array of source light openings 27 for receiving a corresponding array of LED light sources 29. The light sources of the array are mounted to a rectangular back plate structure 30 and register with and are inset within the source light openings when the waveguide is secured to the back plate. It is contemplated that the back plate structure 30 can be a PC board on which the LEDs are mounted. The PC board can, in turn, be mounted to another structure that can act as a heat sink for the heat generated by the LEDs. The light waveguide can be secured to the back plate structure by any suitable means, such as by adhesive attachment or mechanical attachment, and supported by hardware and/or frame components (not shown). An optically bonded reflecting diffuser surface 36 provided on the back of the waveguide causes light that is injected into the waveguide to be extracted through the waveguide's front surface 35. To prevent the light that is injected into the waveguide from escaping through the waveguide's perimeter edges 38, the waveguide's perimeter edges can suitably be covered with a specular reflective material. The injected light from the LEDs will thus reflect off of the waveguide edges and continue to be piped through the waveguide until extracted. Extraction of the injected light through front face of the waveguide will cause the front face of the waveguide to illuminate and exhibit brightness, which will, in turn, cause a reduction in brightness contrast between the visible LEDs and their surrounding surfaces.

It will be appreciated that a planar array of light sources with a waveguide surround as described herein could be provided in a number of shapes other than the square shape illustrated in FIG. 3, such as, for example, a rectangular, hexagonal, circular, or donut shape. The waveguide surround could also be created using more than one waveguide. For example, multiple contiguous or non-contiguous waveguides could be used to create different surround waveguide shapes and configurations for capturing a portion of the light emitted by one or more high brightness light sources. Also, the density of light sources within the array of light sources could be non-uniform. That is, the spacing between the light sources and corresponding source light openings in the waveguide could vary. The array could also be one-dimensional, as in a line of light sources.

Since, in a reasonably large array, light injected into the light waveguide will come from numerous dispersed light sources, it is anticipated that, with a continuous and uniform waveguide having uniform light extraction characteristics, the amount of light extracted at different regions within the waveguide surround will be relatively constant, resulting in relatively uniform brightness over the entire front surface of the waveguide. It is anticipated this would be true even if the density of the light sources and corresponding source light opens is non-uniform. However, if desired, the waveguide surround could be designed to produce non-uniform brightness across the front surface of the waveguide, such as by altering the light extraction characteristics of the waveguide in different regions of the guide.

Finally, it is noted that the waveguide surround shown in FIG. 4 could lie in a curved plane or in a plane that has a combination of curves and flat areas. The light waveguide could further have front and back surfaces that deviate somewhat from parallel, so long as there is enough parallelism that light can be piped through the waveguide.

Figure 5A:
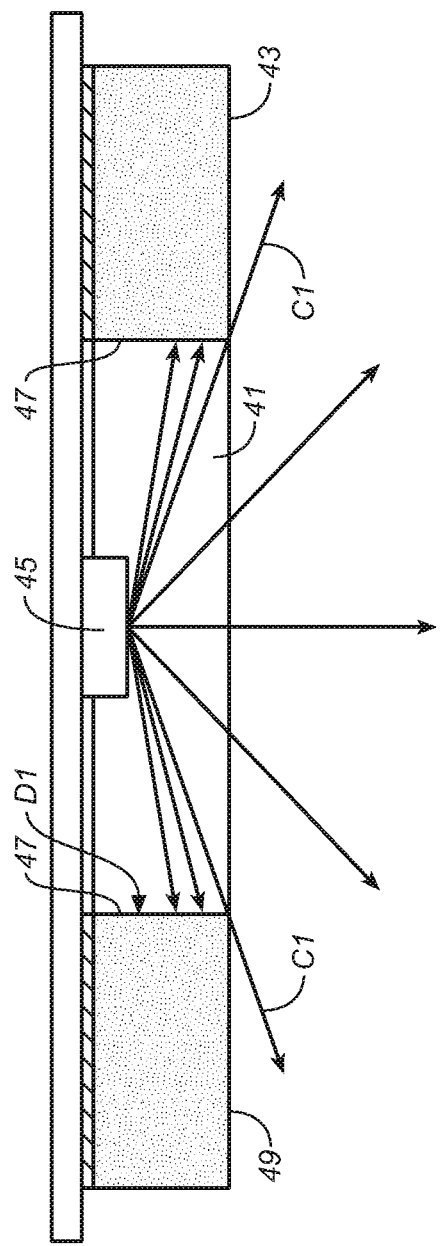
FIG. 5A is a graphical depiction of a variation of an optical system in accordance with the present invention, wherein the variation resides in the size of the source light openings of the optical system's light waveguide.
Figure 5B:
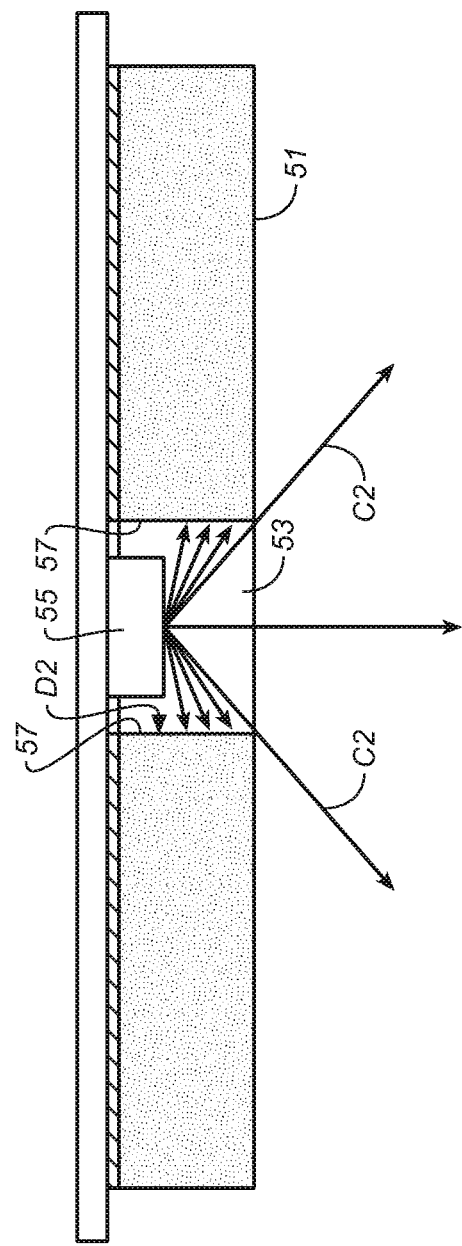
FIG. 5B is a graphical depiction of another variation of an optical system in accordance with the present invention, wherein the variation resides in the size of the source light openings of the optical system's light waveguide.

FIGS. 5A and 5B illustrate how the openings in the waveguide of the optical system of the invention can be sized to control the cut-off angle of a luminaire, as well as the amount of source light injected into surrounding waveguide. (As used herein, the "cut-off" angle of a luminaire relates to a luminaire having an exposed light source and means the angle measured up from the nadir—straight down—to the first line of sight at which the exposed light source is no longer visible.) In FIG. 5A, source light opening 41 of waveguide 43 is shown as having a relatively large diameter D1, such that the cutoff angle for light produced by the LED light source 45, as represented by light ray arrows C1, is relatively high. This large diameter opening results in more of the available light from the LED being emitted from opening 41 and less of the available light being injected into the waveguide through the internal light injection surfaces 47 of the source light openings. Less light injected into the waveguide will also mean there will be less light extracted through the waveguide's light emitting front surface 49, and hence lower brightness for the waveguide surfaces surrounding the LED. (The higher cutoff angle will also mean that the LED will be visible at higher viewing angles.)

In FIG. 5B, a waveguide 51 having the same thickness as the waveguide shown in FIG. 5A is provided with a source light opening 53 having a smaller diameter D2, wherein a greater portion of the available light from the LED light source 55 is injected into the opening's internal light injection surfaces 57, as indicated by the lower cutoff angle represented by light ray arrows C2. As a consequence, more light will be extracted from the waveguide, resulting in surround surfaces for the LED that exhibit a higher brightness. Conversely, less of the available light will be emitted from the source light opening 53. The lower cutoff angle will also mean that the LED will not be visible at high viewing angles, which may be an advantage in many applications.

Figure 6:
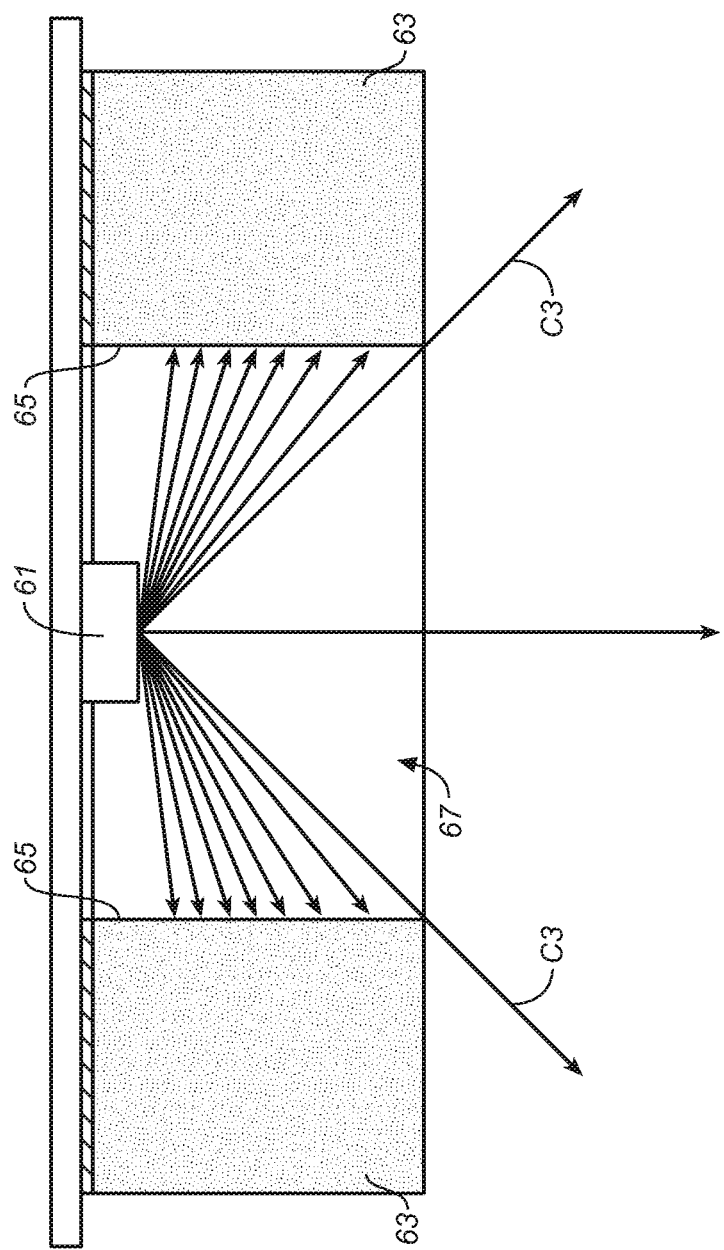
FIG. 6 is a graphical depiction of a further variation of the light waveguide used in the optical system of the present invention, wherein the variation resides in the thickness of the waveguide.

FIG. 6 illustrates how the amount of available light from the LED light source that is injected into the waveguide surround can be controlled by varying the thickness of the light waveguide. As compared to the light waveguides shown in FIGS. 5A and 5B, the light waveguide 63 shown in FIG. 6 is relatively thick. Due to the extension of the internal light injection surfaces 65 of the guide's source light opening 67, a greater amount of available source light is injected into the waveguide, thereby increasing the exhibited brightness of the waveguide surround. This extension of the guide's internal light injection surfaces is also seen to lower the cutoff angle—represented by light ray arrows C3—for the source light emitted from this opening. Thus, it can be seen that the brightness of the light emitting surfaces of the light waveguide surround of the optical system of the invention can be managed by varying the depth and size of the source light openings in the light waveguide surrounding the high brightness light sources. Other characteristics of the source light openings could also be varied, such as the shape of the openings.

Figure 7:
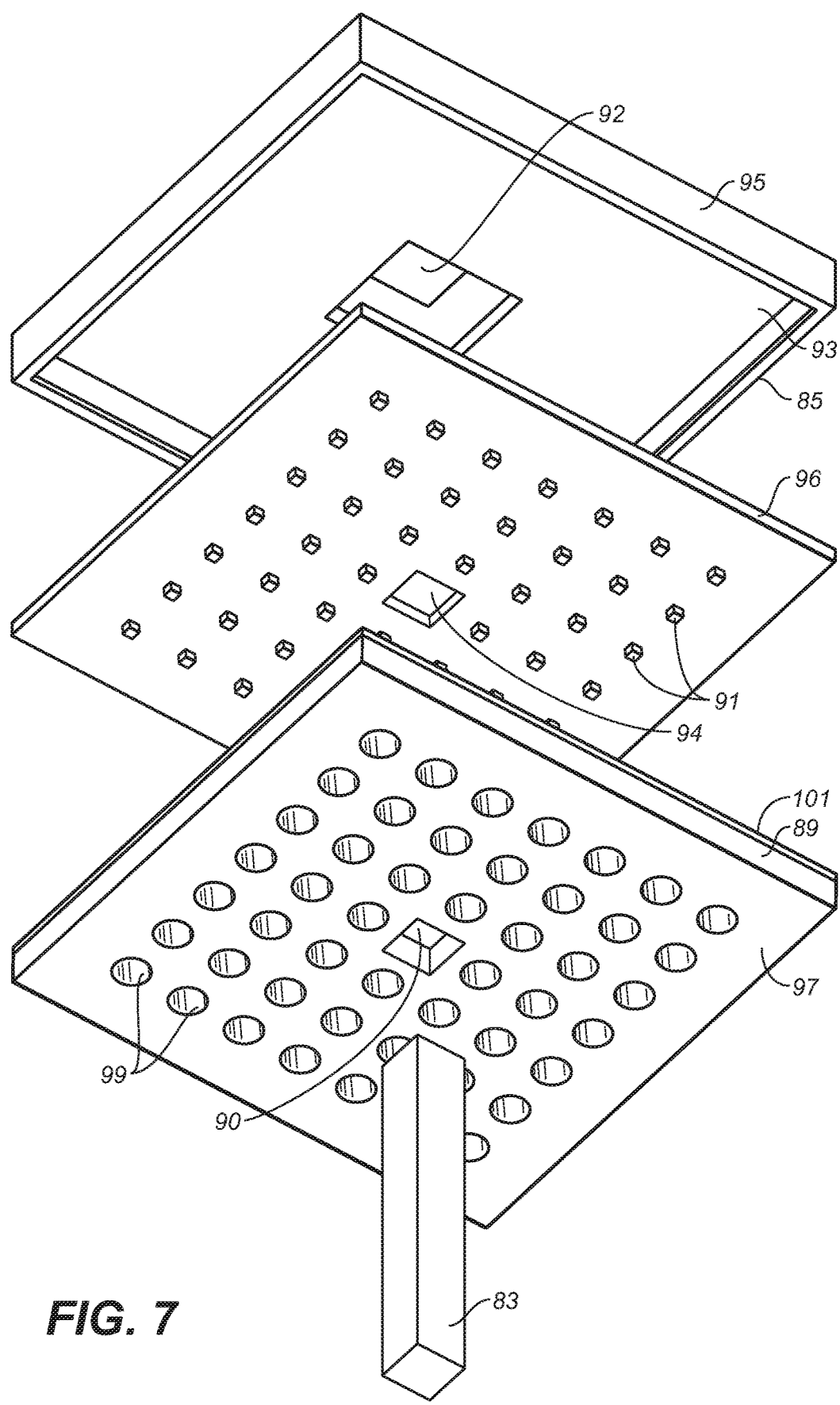
FIG. 7 is an exploded view of an LED post top luminaire employing an optical system in accordance with the invention.
Figure 8A:
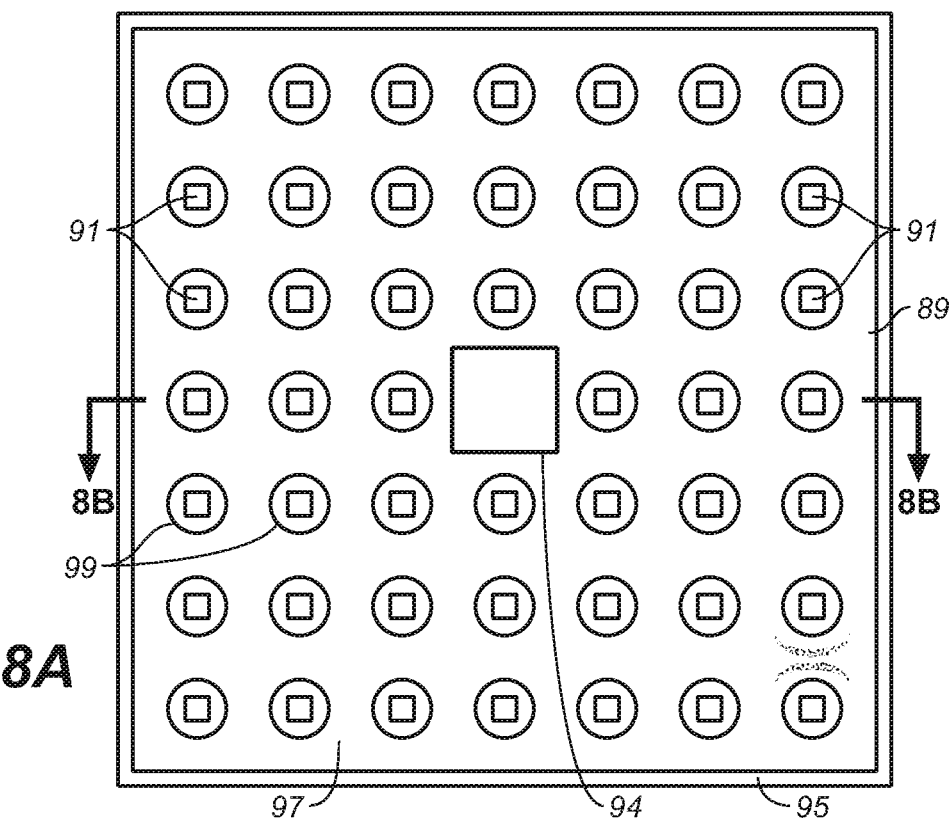
FIG. 8A is a bottom plan view thereof.
Figure 8B:
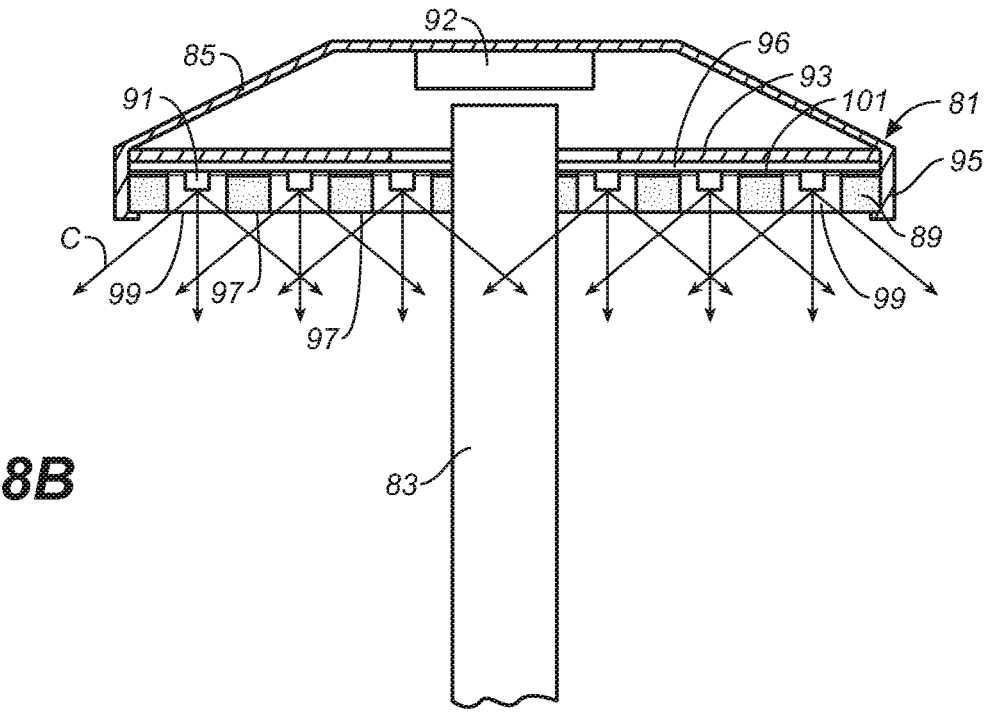
FIG. 8B is a cross-sectional view thereof taken along lines 8B-8B in FIG. 8A.

FIGS. 7, 8A and 8B illustrate an example of an application for an optical system in accordance with the invention. Shown is an LED post top luminaire for illuminating outdoor public spaces. Luminaire 81, which is mounted to the top of post 83 by any suitable means of attachment (not shown), is comprised of canopy housing 85, a light waveguide 89, an array LEDs 91, and an LED array driver 92 contained within the canopy housing. (The wiring of the LEDs and driver are not shown.) The bottom structure of the canopy housing is shown as having a bottom wall 93 and a downwardly depending waveguide retaining skirt 95 for holding the light waveguide 89, such that the bottom light emitting surface 97 of the waveguide faces downward d the public space to be illuminated. The LED array is seen to be mounted to a back plate 96 that can be secured to the canopy housing bottom wall by any suitable securing means (not shown). Both the light waveguide 89 and back plate 96 have suitable center openings 90, 94 for accommodating the luminaire's mounting post 83. It will be appreciated that the canopy housing and its waveguide holding structure are illustrative only, and that a wide variety housing structures for holding the LED array and light waveguide are possible.

With further reference to the luminaire shown in FIGS. 7, 8A and 8B, the light waveguide 89 of the luminaire is seen to include an array of source light openings 99 for receiving the array of LEDs 91. The LEDs, which are inset into these openings, supply light for the waveguide and for general illumination. The light for general illumination is produced by light emitted from the bottom of the luminaire through the source light openings 99. As discussed above, the light waveguide will have a suitable light extracting means, such as an optically bonded reflective diffuse surface 101, for extracting the portion of the LEDs' light that is injected into the waveguide through the waveguide's bottom light emitting surface 97. The extraction of light through the guide's bottom surface will produce brightness across the surfaces that surround the LEDs, thereby reducing the contrast in the brightness between the luminaires LEDs and its surrounding surfaces.

FIGS. 9A and 9B illustrate a variation of the invention, wherein the bright light sources of the waveguide optical system are positioned to alter the light intensity distribution of the source light that is emitted from the waveguide's source light openings. Rather than being centered within the source light openings, in FIGS. 9A and 9B, the light sources, such as LEDs 105, are seen to be offset within the circular openings 107 of light waveguide 109. By offsetting the light sources within the waveguide openings, the cutoff angles around the openings can be manipulated, as graphically illustrated by the light ray arrows $C_h$ and $C_L$, where $C_h$, represents a high cutoff angle and $C_L$ represents a low cutoff angle. In such a configuration, a luminaire such as shown in FIGS. 7, 8A, and 8B, could be created where high brightness produced by the bright light sources could be suppressed at high angles when viewed from one direction, while a wider distribution of light resulting from a higher cutoff angle is achieved in the other direction. It is seen that the light emitting surface 111 of the light waveguide 109 will produce a surround brightness for the offset light sources 105. (Where the surround brightness produced across the waveguide's light emitting surface is produced from the cumulative effect light injected into the guide from multiple sources, it is contemplated that the offsetting of the light sources in the guide openings will not appreciably affect the uniformity of the brightness across the light waveguide.)

FIGS. 10 and 11 show examples of light waveguides in accordance with the invention, wherein the waveguide source light openings are provided in different shapes for achieving different desired lighting effects. FIG. 10 shows light source openings 115 having an oval shape with the light sources 117 offset within the oval openings; FIG. 11 shows rectangular-shaped openings 121 with light sources 123 similarly offset. It will be appreciated that the light sources 117, 123 shown in FIGS. 10 and 11 could be centered within the shown out-of-round light source openings.

Figure 12A:
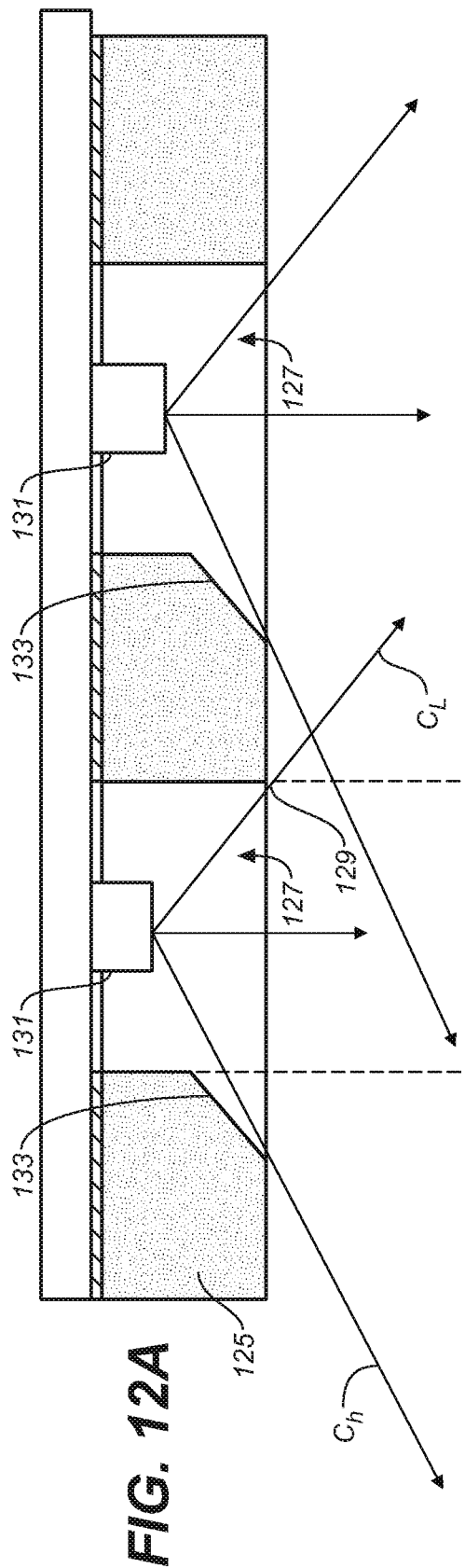
FIG. 12A is a graphical depiction of variation of an optical system in accordance with the present invention, wherein the variation resides in the edge treatment of the source light openings of the light waveguide.
Figure 12B:
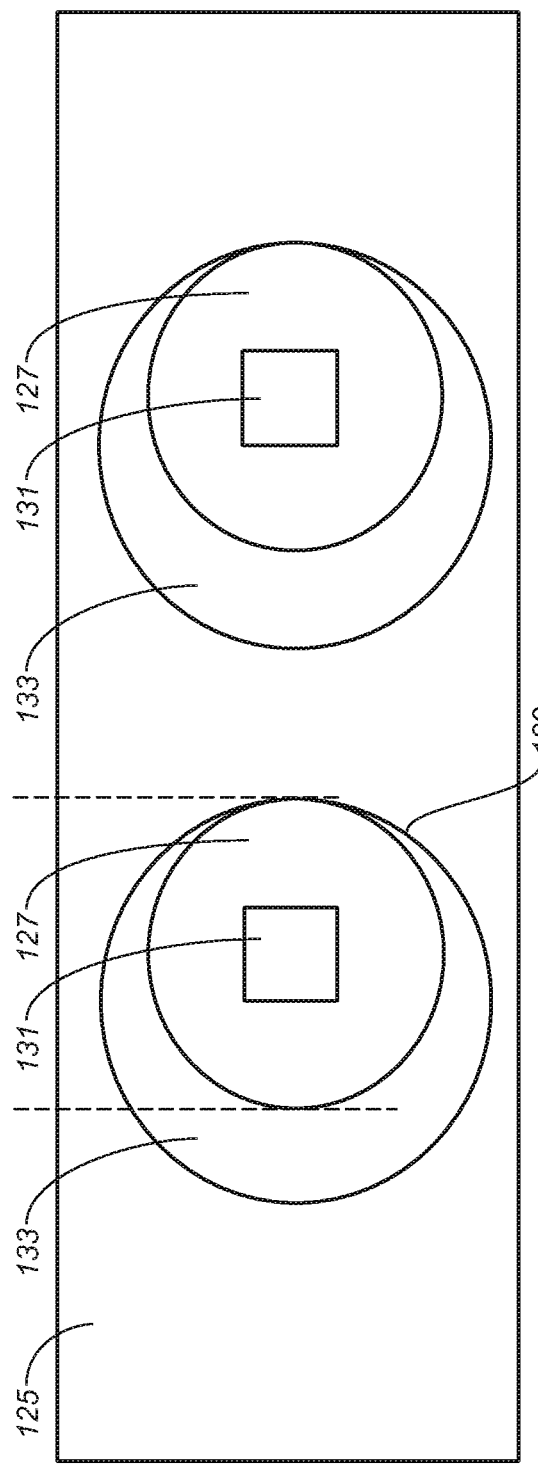
FIG. 12B is a bottom plan view of the optical system shown in FIG. 12A.

FIGS. 12A and 12B show yet another variation of the configuration of the source light openings of the light waveguide used in the optical system of the invention. In FIGS. 12A and 12B, the light waveguide 125 is provided with source light openings 127, wherein the front edge 129 of the opening 127 is modified to alter the cutoff angle of the light emitted through the openings by the bright light sources 131. In these figures, a chamfer 133 is provided along one side of the opening to produce a high cutoff angle $C_h$ on the chamfered side and a lower cutoff angle on the non-chamfered side. However, it will be understood that a symmetric or an asymmetric chamfer could be provided around the entire opening so as to raise the cutoff angle around all sides of the waveguide.

It is noted that different configurations for the source light openings in the waveguide of the lighting system of the invention can be combined within a single lighting system. Thus, for example, it is within the scope of the invention to provide a waveguide with a mixture of circular, oval and/or square source light openings, and to provide some of the openings with chamfered edges and some without.

Figure 13:
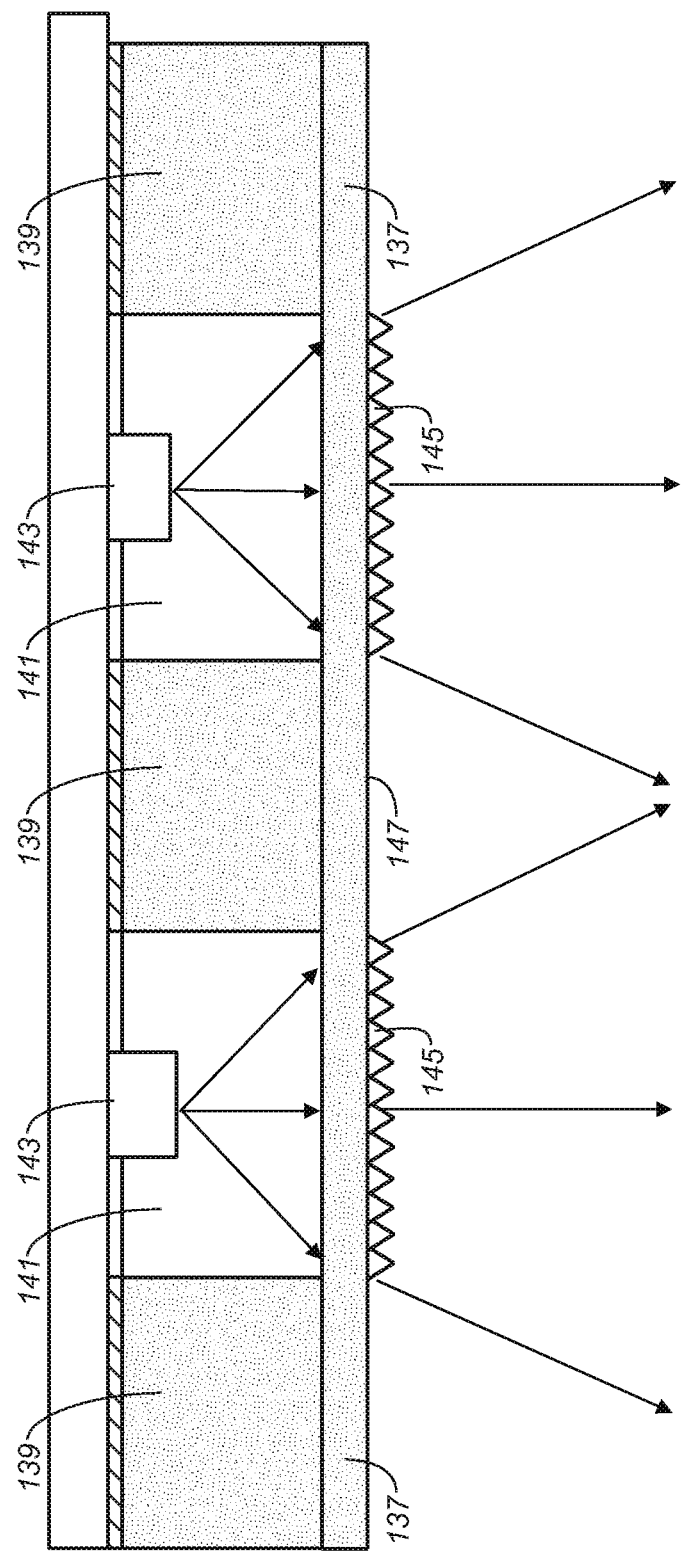
FIG. 13 is a graphical depiction of an optical system in accordance with the invention, wherein secondary optical control elements in the form of prismatic lenses are provided at the front of the source light openings in the light waveguide of the optical system.
Figure 14:
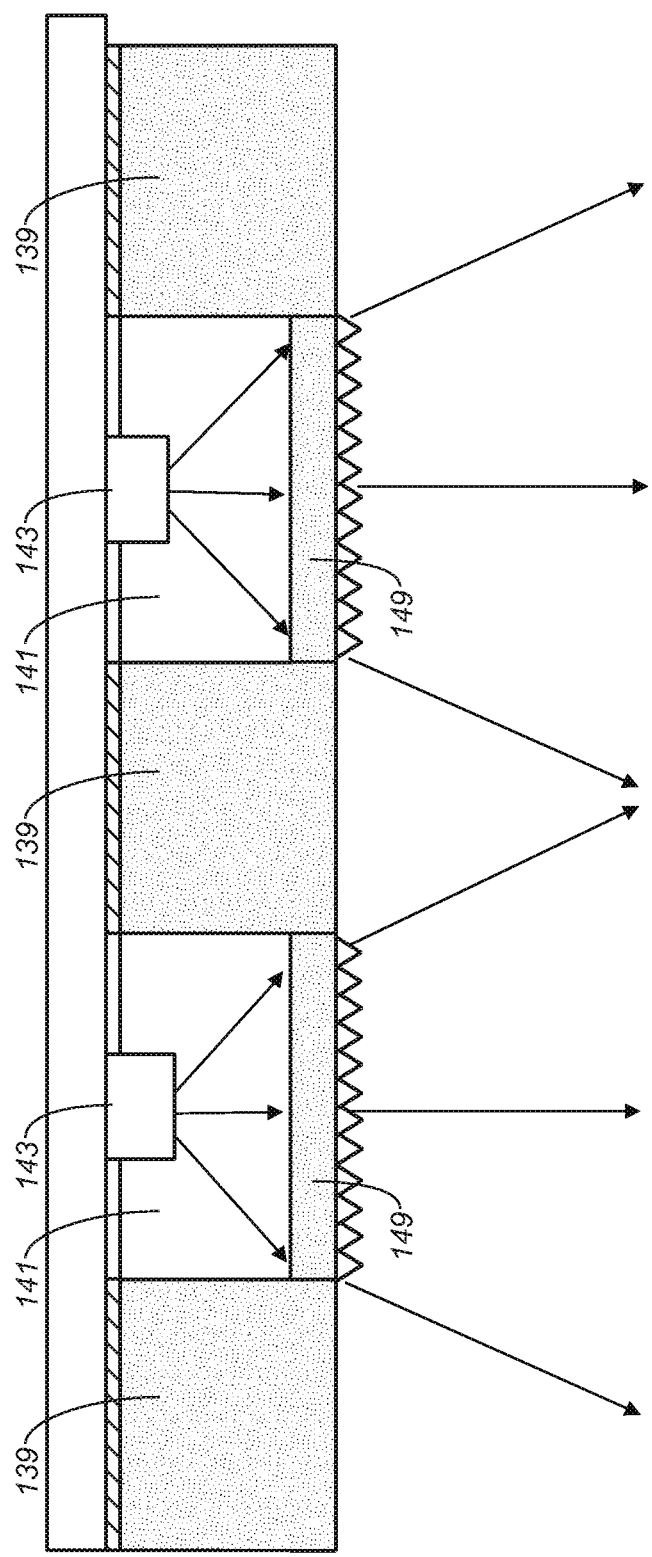
FIG. 14 is a graphical depiction of an alternative version of the secondary optical control elements shown in FIG. 13.
Figure 15:
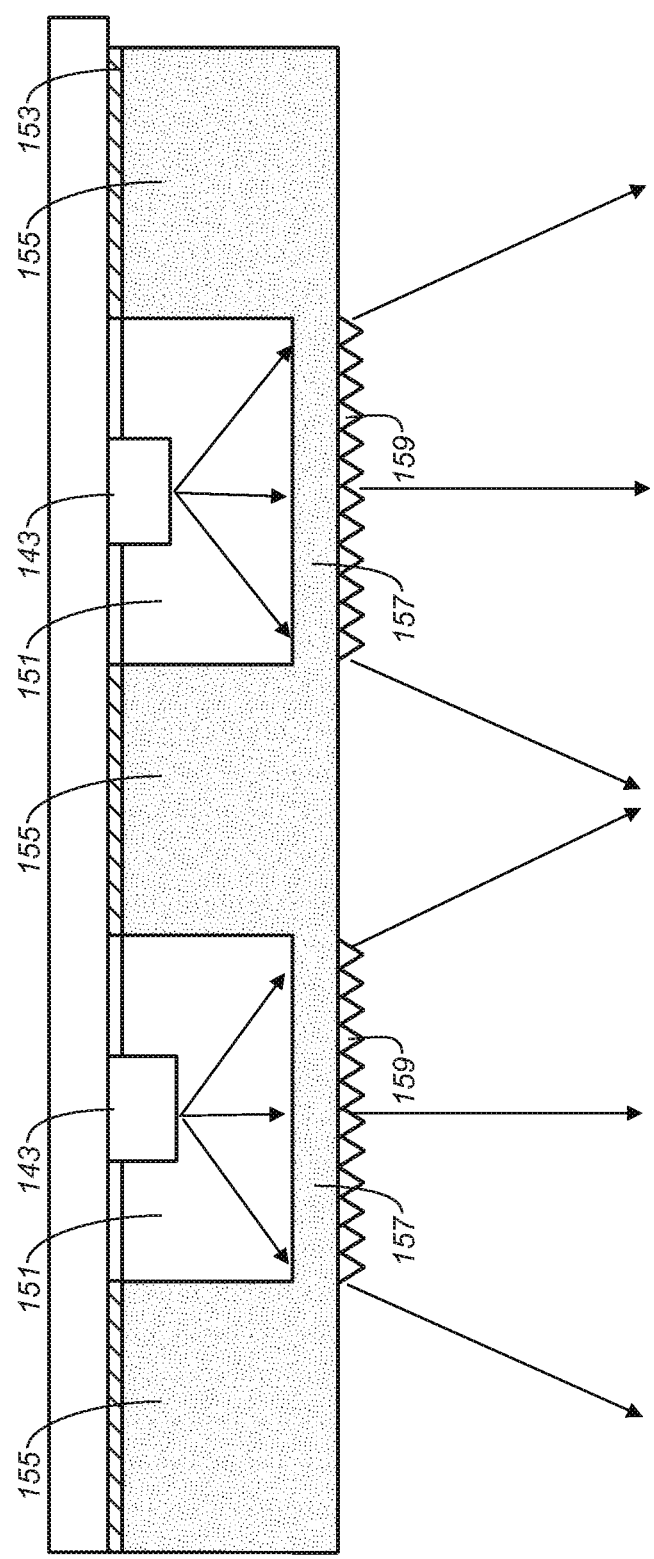
FIG. 15 is a graphical depiction of another alternative version of the secondary optical control elements shown in FIG. 13.

FIGS. 13-15 illustrate how secondary optical control elements, such as prismatic lenses, can be used in connection with the waveguide of the invention for creating a desired light distribution from the source light exiting the waveguide's source light openings. In FIG. 13, a transparent secondary lens plate 137 is placed in front of the light waveguide 139 over the source light openings 141 in the light waveguide. The lens plate 137 is provided with prismatic lens portions, which in the illustrated embodiment are prismatic surfaces 145 formed on the front surface 147 of the lens plate. It is seen that the prismatic lens portions are located on the lens plate so that they register with the source light openings. Thusly located, light emitted by the LEDs that is not injected into the surrounding waveguide will pass through and be controlled by the prismatic lenses.

FIG. 14 shows an embodiment of the invention similar to that shown in FIG. 13, except that instead of providing a lens plate that covers the bottom of the light waveguide 139, separate lens element inserts 149 are placed in the front light exiting end of the source light openings of the light waveguide.

FIG. 15 shows an embodiment in which the lens elements are integrated into the light waveguide. In this embodiment, source light openings 151, which receive light from LEDs 143, are provided in the back 153 of the light waveguide 155 to a suitable depth that leaves a transparent wall 157 at the bottom of the source light openings. Prismatic surfaces 159 are provided on the front of the transparent wall 157 at the front light existing end of the openings.

It is noted that the range of optical control elements that can be used to control light emerging from the front light exiting end of the source light openings of the waveguide is not limited to the prismatic lenses illustrated in FIGS. 13-15. Also, the prismatic lenses need not cover the entire source light opening as illustrated, but could cover only a portion of the opening. Further, a prismatic surface could be provided on interior surfaces as well as exterior surfaces of the lens elements.

It is seen that, unlike in previously described embodiments, in the embodiments of the invention illustrated in FIGS. 13-15, the LEDs would not be directly visible to the observer at any viewing angle. Using secondary optics that cover the light sources, the contrast in brightness on the observable surfaces of the luminaire would be produced by a contrast between the brightness of the observable optical elements in front of the light sources and the brightness produced in the waveguide surfaces surrounding the light waveguide. In addition to providing greater control over light intensity distribution, secondary optical control elements can be designed to control brightness at the front of the source light openings. Thus, their use at the front of the source light openings would provide the lighting designer with an added tool to manage contrast brightness.

FIGS. 16-22 show yet further alternative embodiments of the invention wherein source light openings are provided in the light waveguide in the form of elongated channel openings. These channel openings could be curved or straight and can be distributed in different patterns in the waveguide. At least one high brightness light source, and most suitably a string of LEDs are arranged in or in relation to the channel openings so that a portion of the light emitted by a light source or sources is injected into and then extracted from the front observable surface of the waveguide as above-described.

Figure 16A:
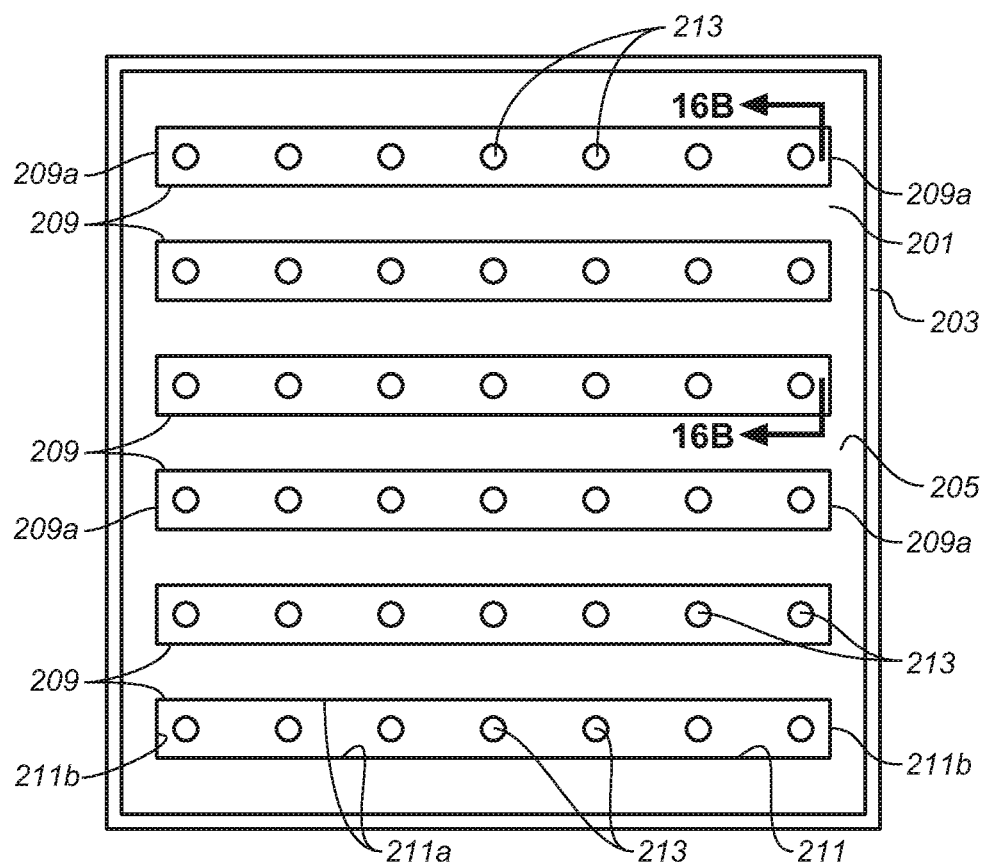
Figure 17:
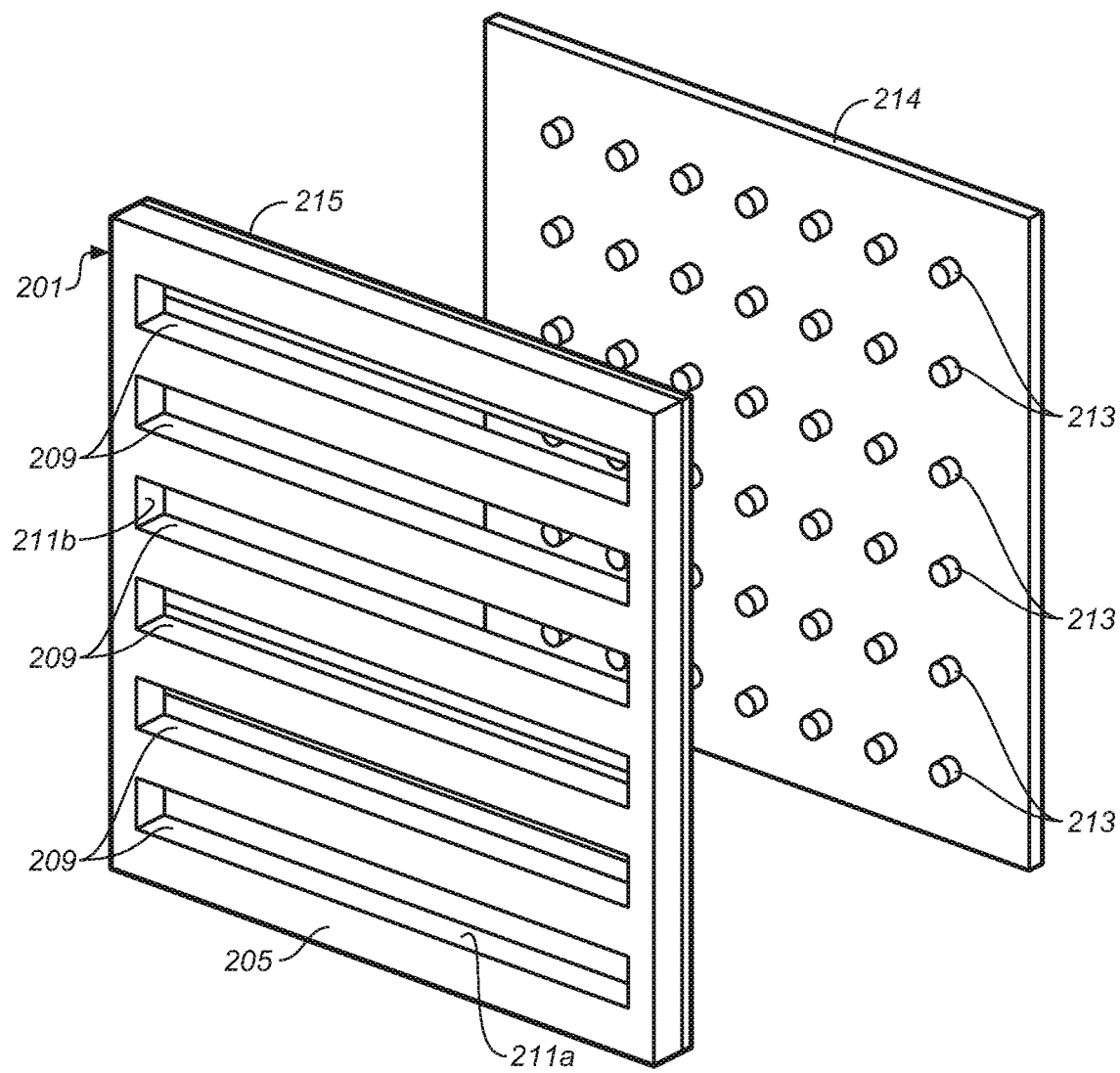

Referring to FIGS. 16A, 16B and 17, a luminaire light waveguide 201 held in a frame 203 has a front surface 205 and a back surface 207, and is seen to have light source openings in the form of a series of straight source light channels 209, each of which provide internal light injection surfaces 211 that are perpendicular to the waveguide's front and back surfaces 205, 207. A series of high brightness light sources is set in each of light channels for producing source light along the length of the channels. The light sources are suitably a string of LEDs 213 spaced equidistant apart over substantially the length of each channel. And this string of LEDs is suitably mounted to a back plate 214 which covers the back surface of the waveguide. It is noted that the ends 209a of the source channels 209 are set back from the edges 202 of the light waveguide such that the waveguide completely surrounds each of the channels. In this configuration, light can be injected into the waveguide along the long light injection surfaces 211a and the relatively short end light injection surfaces 211b. As will be illustrated in further examples described below, source light channels can be provided in the light waveguide in a wide variety of channel configurations, including configurations where the light waveguide only partially surrounds the channels, or continuous channels with continuous light injection surfaces and no channel ends.

With further reference to FIGS. 16A, 16B and 17, it is seen that each source light channel 209 is seen to provide internal light injection surfaces 211 in the waveguide which receive a portion of the light emitted by the LED string set in the channel. This portion of the available source light, which is represented by light rays R4, is injected into and captured by the surrounding light waveguide. This injected portion of source light is extracted through the front surface of the waveguide by optically bonded reflective diffuser layer 215 on the waveguide's back surface 207. As described above, the extracted light emerges from the front surface 205 of the waveguide which surrounds the LED channels, causing the waveguide's front surface 205 to exhibit brightness. Again, it is noted that the reflecting diffuser layer 215 need not provide a perfectly diffuse surface, but could provide a semi-diffuse surface.

As represented by light rays R6 in FIG. 16B, much of the light, or luminous flux, that is produced by the LED strings 213 is not injected into the light waveguide, but rather travels forwardly so as to emerge directly from the front light exit end 210 of the source light channels 209. This directly emitted light will produce relatively intense visible brightness along each channel for illuminating the space in front of the waveguide.

FIG. 16C shows a variation of the light waveguide illustrated in FIGS. 16A and 16B. Here, the light waveguide 217 has elongated parallel source light channels 219, which do not extend through the entire thickness of the waveguide as in the previously described embodiment, but rather partially into the waveguide to a depth that leaves a channel back wall 220 against which the series of LEDs 213 can be mounted. Like the previously described version, a reflecting diffuser layer 221 can be applied to the back surface 223 of the waveguide to achieve light extraction through the guide's front surface 225. The partial depth channels can be routed channels or formed by other manufacturing means.

Figure 18:
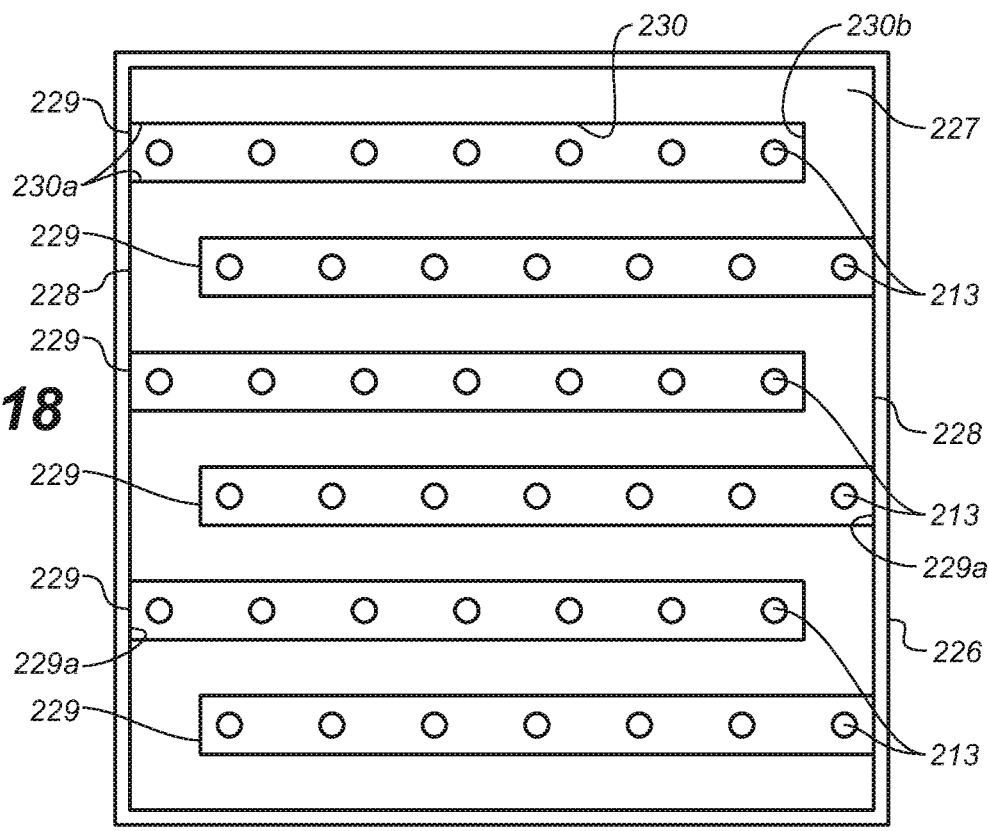

FIG. 18 shows an alternative embodiment of the light waveguide wherein, instead of straight source light channels that are completely surrounded by the light waveguide, the light waveguide only partially surrounds the channels. Here, light waveguide 227 has a series of straight source light channels 229 shifted to opposite edges 228 of the waveguide to form interleaved channels, each of which has one of its ends 229a facing the waveguide frame 226. As in the previous embodiment, each shifted channel provides light injection surfaces 230, which includes long light injection surfaces 211a and a short end light injection surface 230a. Source light would not be injected into the waveguide at channel end 229a which faces waveguide frame 226. Light sources such as a string of LEDs are inset into the channels which are open to the front of the waveguide. As with the previously described embodiments, a portion of the light emitted by these light sources is injected into and then extracted from the front of the waveguide. The portion not injected into the light waveguide emerges directly from the front light exit end of the source light channels without being injected into the waveguide. This portion of the emitted light illuminates the space in front of the waveguide.

Figure 19:
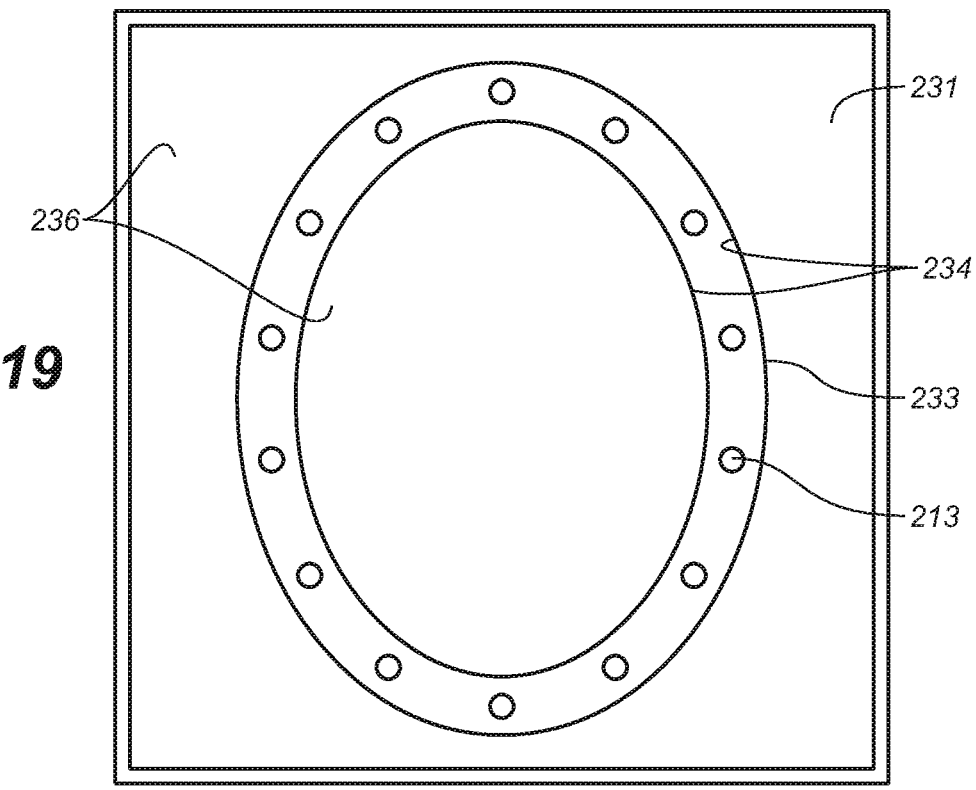
FIGS. 19-21 are graphical depictions of yet further embodiments of an optical system in accordance with the invention, wherein the source light openings in the light waveguide are provided in the form of source light channels that follow a curved path.
Figure 20:
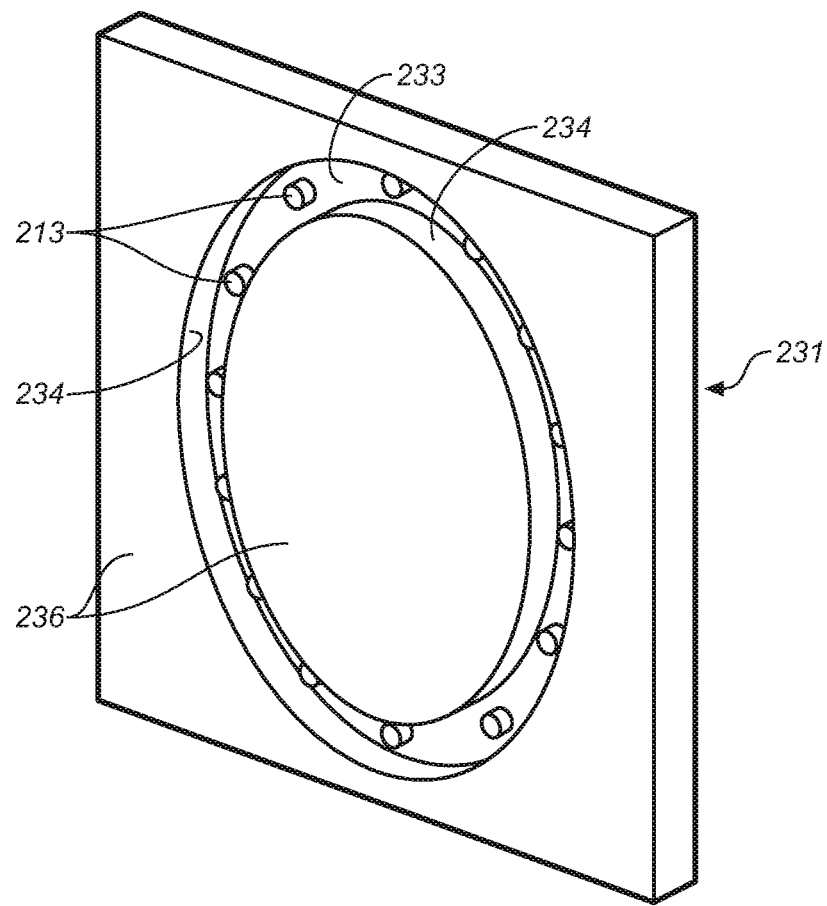
Figure 21:
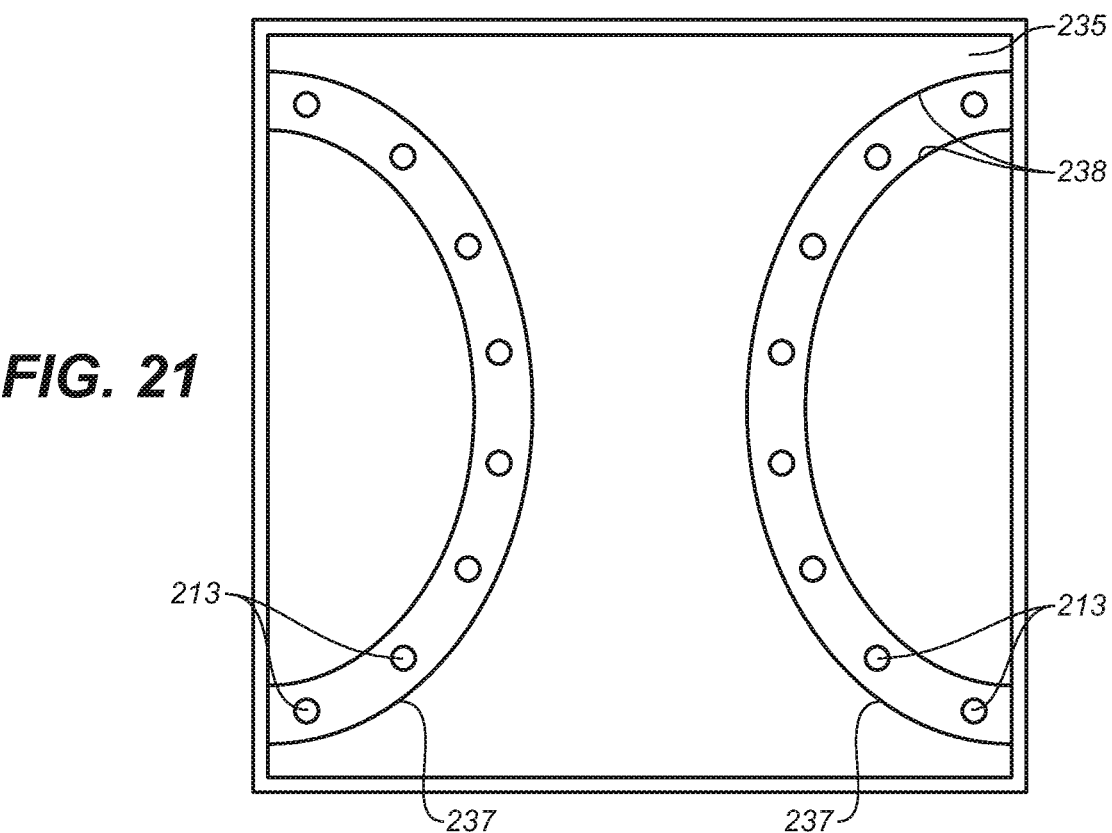

In the embodiment shown in FIGS. 19-20, light waveguide 231 has a single generally circular, or more precisely oval, source light channel 233 instead of straight channels. Light sources, such as the shown string of LEDs 231, are inset in this channel such that a portion of the light emitted by the light sources is injected into the channel's opposed curved light injection surfaces 234. The portion not injected into waveguide 231 emerges from the front of the guide to illuminate a space. FIG. 21 shows another example of the use of curved channels. Here, waveguide 235 is provided with half circle channels 237 which provide curved light injection surfaces 238. A string of LED light sources 231 can be inset into each of these channels as shown.

In the embodiments shown in FIGS. 19-21, a partial depth channel is preferably used an that the waveguide can be fabricated from a single sheet of transparent material. The waveguide surrounds the source light channel in that it borders both the inner and outer sides of the oval ring that constitutes the channel. It will be appreciated that many different configurations of source light channels are possible that follow curved paths, such as S-configurations, and that source light channels with different curved configurations or curved and straight configurations could be combined in a single light waveguide.

Figure 22:
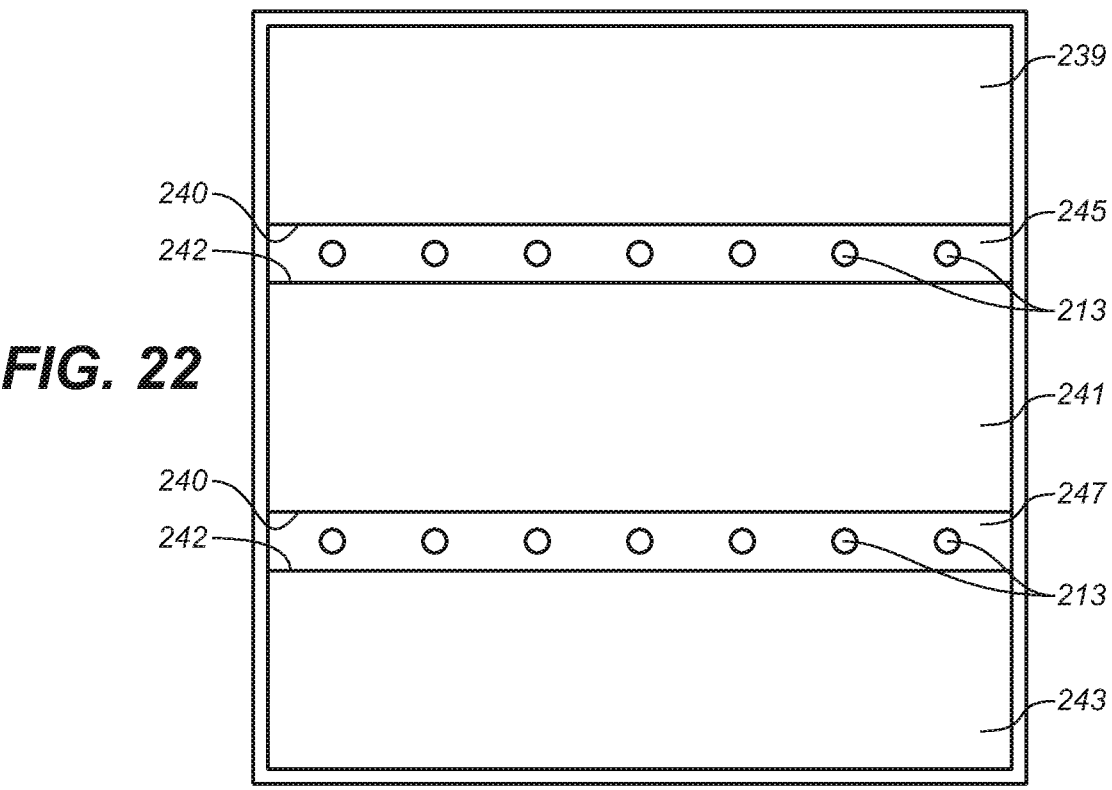
FIGS. 22-23 are graphical depictions of still a further alternative embodiment of an optical system accordance with the invention, wherein the source light openings in the light waveguide are provided in the form of straight source light channels formed by separate sections of waveguide.
Figure 23:
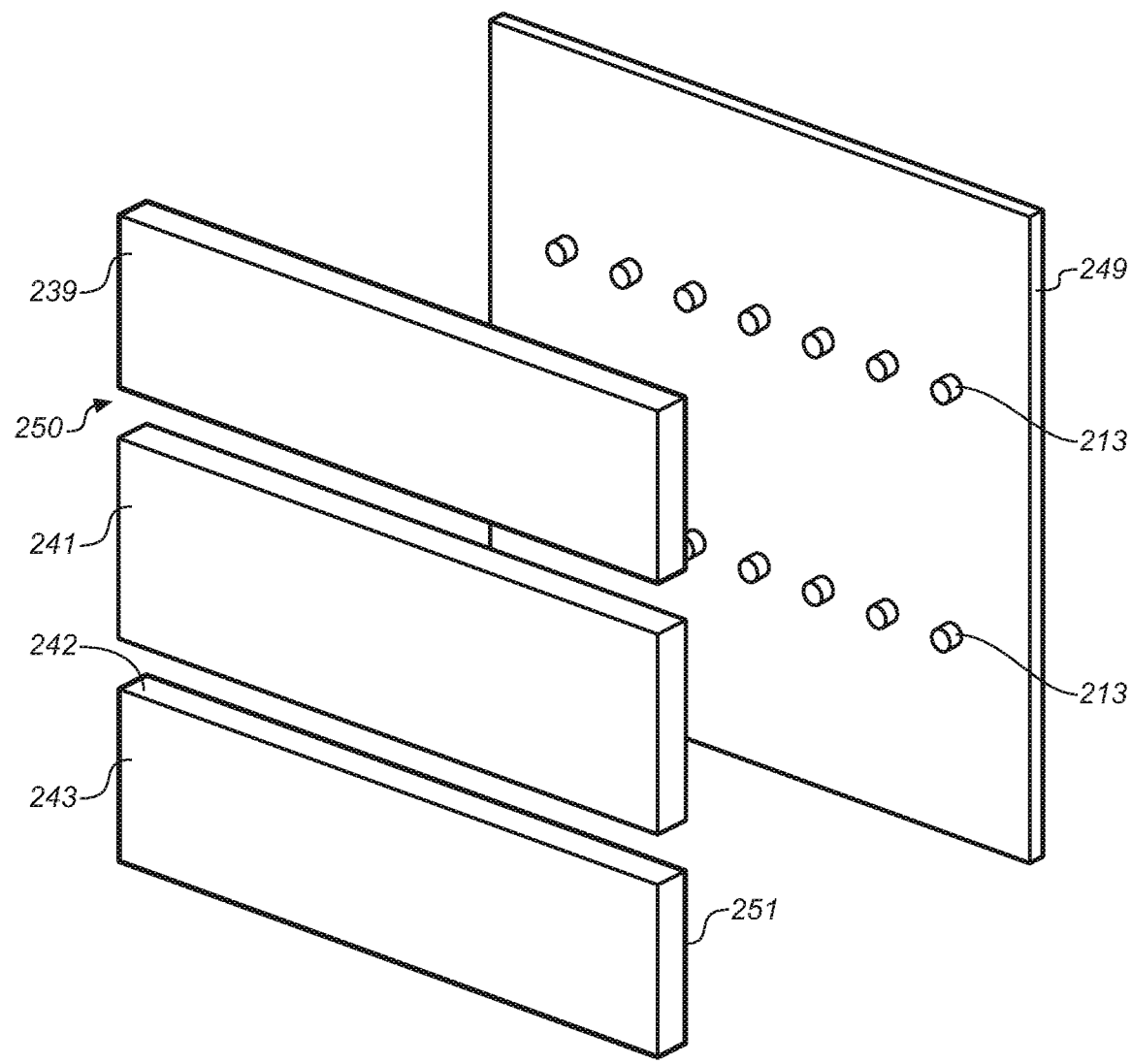

FIGS. 22-23 illustrate an example wherein the light waveguide, denoted b the numeral 250, can be fabricated in sections, in this case a top section 239, a middle section 241 and a bottom section 243, all of which are mounted to back plate 249 so as to form two source light channels 245, 247. Source light channels 245, 247 present opposed internal light injection surfaces 240, 242 which extend the width of the waveguide and though which a portion of the light emitted by light sources 213 can be injected into the waveguide sections. The back of each waveguide section 239, 241, 243, such as back surface 251 of section 239, can be provided with a reflecting diffuser layer (not shown) for light extraction. As with the earlier described embodiments, a substantial portion of the light emitted by the light sources 213 emerges from the front of the source light channels 245, 247 without being injected into the waveguide section. As before, this portion of the emitted light is used to illuminate a space.

It will be appreciated that secondary optical control elements, such as prismatic lenses, can be placed in or over the front openings of the source light channels in the embodiments of the invention illustrated in FIGS. 16A-23 in a manner similar to the lens elements illustrated in FIGS. 13-15 for controlling the distribution of light from the waveguide or brightness at these openings. The optical elements can be elongated optical elements that cover the front opening of the source light channel or channels over the entire length of the channel or channels, or only a portion of the channel length. Where there is more than one source light channel, optical elements can be placed in or over all or less than all of the channels.

While the invention has been described in considerable detail in the foregoing specification, it will be understood that it is not intended that the invention be limited to such detail, or to the various embodiments disclosed herein, unless such limitations are expressly indicated or recited in the following claims. Variations of the invention not expressly disclosed herein, but which fall within the spirit and scope of the invention, will be evident to persons of ordinary skill in the art.

What I claim is:

1. An optical system for managing the brightness of surfaces surrounding one or more high brightness light sources of a luminaire or lighting system for providing illumination within a space, comprising
    a substantially planar light waveguide having a front with an observable front surface and a back with a back surface,
    at least one source light opening in said light waveguide, wherein said light source opening is in the form of a channel, wherein at least a portion of the observable front surface of said light waveguide at least partially surrounds the channel forming said source light opening, and wherein the portion of the observable front surface surrounding said source light opening is light transmissive, the channel which forms said source light opening providing internal light injection surfaces in said waveguide, and
    at least one high brightness light source for producing source light for the luminaire, said high brightness light source being positioned in relation to the back of the light waveguide and the channel forming the source light opening therein such that the following conditions are met:
    a) source light is emitted from said high brightness light source over a substantial portion of the channel forming the source light opening,
    b) a portion of the available source light emitted by said light source travels forwardly of said light source and exits the front of the light waveguide without being injected into the waveguide so as to produce an observable area of high brightness at the front of the light waveguide, said area of source brightness providing illumination within a space, and
    c) a portion of the available source light from said light source is injected into the light waveguide through the internal light injection surfaces provided by the channel forming the source light opening in said light waveguide,
    said light waveguide having means for extracting source light that is injected into said light waveguide through at least the portion of the front surface of the waveguide that at least partially surrounds the channel forming said source light opening, wherein at least the portion of the front surface of said light waveguide that at least partially surrounds the channel forming said source light opening exhibits elevated brightness that mitigates the observable contrast in brightness between the area of high brightness produced by the high brightness light source and the front surface of the light waveguide that at least partially surrounds the source light channel.

2. The optical system of claim 1 wherein said at least one light source is at least partially inset into the channel forming the at least one source light opening of said light waveguide.

3. The optical system of claim 1 wherein the source light opening in said light waveguide is comprised of at least one straight elongated channel.

4. The optical system of claim 1 wherein a plurality of source light openings are provided in said light waveguide in the form of a plurality of straight elongated channels.

5. The optical system of claim 1 wherein said means for extracting injected source light through the front surface of said light waveguide includes a reflective diffuse layer optically bonded to the back surface of said light waveguide.

* * * * *